United States Patent [19]
Heinzel

[11] Patent Number: 5,499,883
[45] Date of Patent: Mar. 19, 1996

[54] STRETCHER OR CROSSRIB OF WOOD FOR CHAIRS AND TABLES

[75] Inventor: Eberhard Heinzel, Hallenberg, Germany

[73] Assignee: Kusch & Co. Sitzmobelwerke KG., Hallenberg, Germany

[21] Appl. No.: 242,006

[22] Filed: May 12, 1994

[30] Foreign Application Priority Data

May 13, 1993 [DE] Germany .......................... 43 15 805.6

[51] Int. Cl.⁶ .................................................. F16B 12/10
[52] U.S. Cl. ........................... 403/219; 403/218; 403/174; 403/341; 297/440.1; 108/180
[58] Field of Search ....................... 403/169, 170, 403/173, 174, 175, 177, 178, 217, 218, 219, 364, 341, 347, 346, 354, 400; 297/440.1, 440.13; 108/180, 190, 153

[56] References Cited

U.S. PATENT DOCUMENTS

| | | | |
|---|---|---|---|
| 1,744,799 | 1/1930 | Provisor | 297/440.13 X |
| 2,466,148 | 4/1949 | Birr | 403/173 X |
| 2,658,776 | 11/1953 | Wilcox | 403/219 X |
| 4,383,780 | 5/1983 | Davison | 403/219 |
| 4,493,582 | 1/1985 | Drabsch | 403/267 X |
| 4,684,282 | 8/1987 | Lever | 403/219 |
| 5,127,759 | 7/1992 | Orbom | 403/218 X |
| 5,185,982 | 2/1993 | Hostetler | 403/219 X |
| 5,349,800 | 9/1994 | Peng | 403/403 X |

FOREIGN PATENT DOCUMENTS

| | | | |
|---|---|---|---|
| 2404139 | 5/1979 | France | 403/347 |
| 2544808 | 10/1984 | France | 403/364 |
| 1138 | of 1898 | United Kingdom | 403/173 |
| 354959 | 8/1931 | United Kingdom | 403/217 |
| 1405586 | 9/1975 | United Kingdom | 403/173 |

*Primary Examiner*—Kenneth J. Dorner
*Assistant Examiner*—Harry C. Kim
*Attorney, Agent, or Firm*—Young & Thompson

[57] ABSTRACT

A stretcher or crossrib (1) for seating furniture, such as chairs, and for tables has four rib parts (4) of solid wood, preferably beech wood, in the form of flat pieces arranged at an angle to one another. Their butt ends (5) are interconnected by tenons (6) into a cross with different spacing angles α, β and are glued. A connecting element 7 is used to hold the butt ends (5) of the four rib parts (4) form-fittingly. Connecting element (7) is composed of a top part (8) and a bottom part (9). Top part (8) and bottom part (9) of connecting element (7) hold butt ends (5) of rib parts (4) in corresponding holes (10) form-fittingly and are screwed to rib parts (4). Top part (8) and bottom part (9) of connecting element (7) can be gussets.

4 Claims, 3 Drawing Sheets

STRETCHER OR CROSSRIB OF WOOD FOR CHAIRS AND TABLES

FIELD OF THE INVENTION

The invention relates to stretchers or crossribs of wood for seating furniture, e.g. chairs and for tables.

BACKGROUND OF THE INVENTION

A wooden chair is known from U.S. Pat. No. 1,744,799 with a frame which consists of a crossrib screwed to a seat, four chair legs screwed to the two planar rib parts of the crossrib, and a crossbar construction which reinforces the chair frame; the two planar bars of the crossbar construction are screwed to the bottom sections of the chair legs. Both the two rib pans and the two bars are weakened by cutouts in the junction with a depth which corresponds to half the rib or bar height. Due to the inadequate flexural and torsional strength of the crossrib the seat is made correspondingly strong and thus very hard so that it is not possible to sit comfortably in the chair, as would be desirable. To increase the strength of the crossrib construction a reinforcing plate with bent projections which surround the bars is attached to the top of the two bars at the junction.

When the long rib parts for the crossrib and the long bars for the crossbar construction of this known chair are cut out from boards, due to knots, knotholes, etc. comparatively large amounts of waste material are formed, so that due to the required amount of wood for the crossribs and crossbars the chair becomes too expensive for mass production.

The same disadvantage applies to commercially available seating furniture and tables of wood with crossribs which consist of one long rib part and two short rib parts which are dowelled to the long rib part.

Because of this construction, the known crossribs, due to the vertical and horizontal forces which occur, are subject to flexural and torsional stresses which can cause the wood connecting elements, especially dowels, to break. Finally, chair and table frames with crossribs with rib parts which exceed a certain length tend to instability.

A rib frame for stacking chairs and armchairs with a front and a rear rib as well as two side ribs of wood is known from DE 37 08 991 C1. The front rib of the rib frame is connected by its two ends via tenons to the two front chair legs and is mortised in the end regions to the side ribs. The rear rib consists of two subribs located in a V-shape in one horizontal plane; their ends pointing outwards are mortised to the two rear chair legs. In addition, the two subribs in their outer section are each mortised to a side rib and the inside ends of the subribs which taper to a point are mortised obliquely to a middle bar which connects the side ribs in the center of the bar.

This complex rib construction is comparatively expensive due to the amount of wood needed to produce it.

The problem of the invention is to develop a structurally simple, stable, and cost favorable crossrib of wood for seating furniture and tables.

SUMMARY OF THE INVENTION

The crossrib according to the invention is characterized by the following advantages:

The use of one connecting element in the form of two gussets or correspondingly formed plastic shells which hold the inside ends of the four rib parts form-fittingly and which are screwed to them enables a crossrib to be produced from four short pieces of lumber which is cheaper, because of the small amount of waste, than the long rib part which is used in known crossribs. Form-fitting holding of the inside ends of the four rib parts in the connecting element preferably composed of two gussets or two plastic shells guarantees the required flexural and torsional stiffness of the chair or table frame. Finally, the length of the seating holes for the rib parts is fixed by the size of the connecting element and thus the stiffness of the chair or table frame can be influenced with respect to a desired specific elasticity of the chair or table legs.

BRIEF DESCRIPTION OF THE DRAWINGS

The invention is detailed below using an embodiment represented in the drawings.

DETAILED DESCRIPTION OF THE INVENTION

Figure 1:
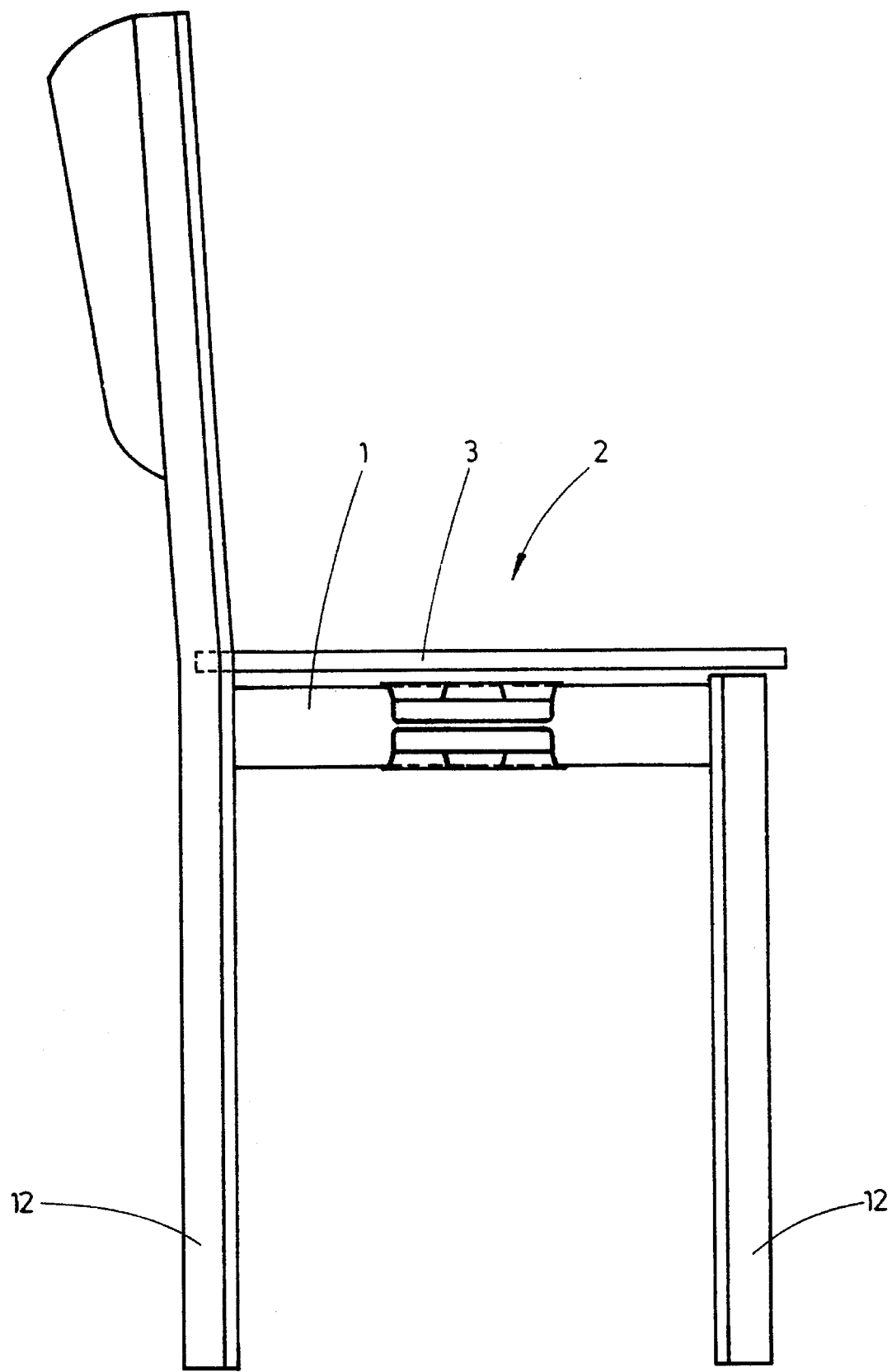
FIG. 1 shows a side view of a chair equipped with the new crossrib.
Figure 2:
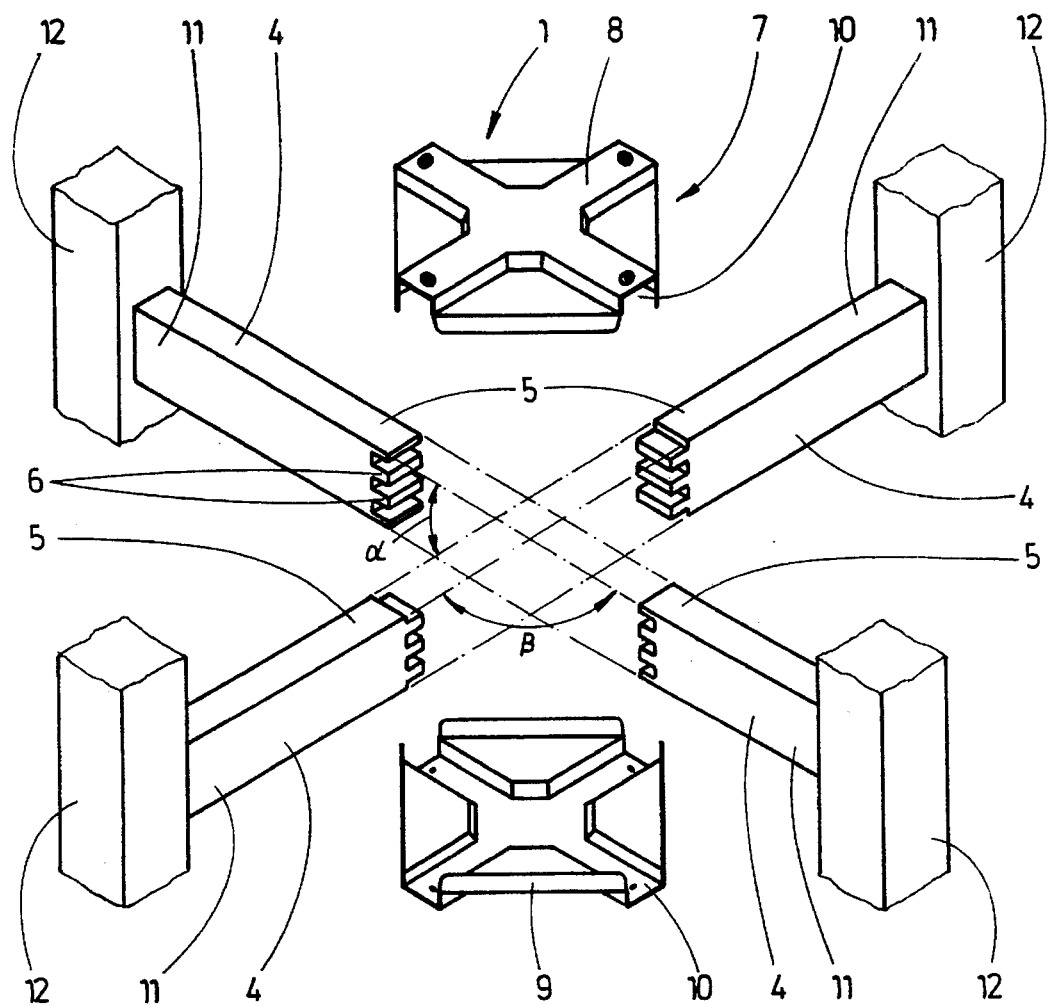
FIG. 2 shows an exploded perspective view of the crossrib.
Figure 5:
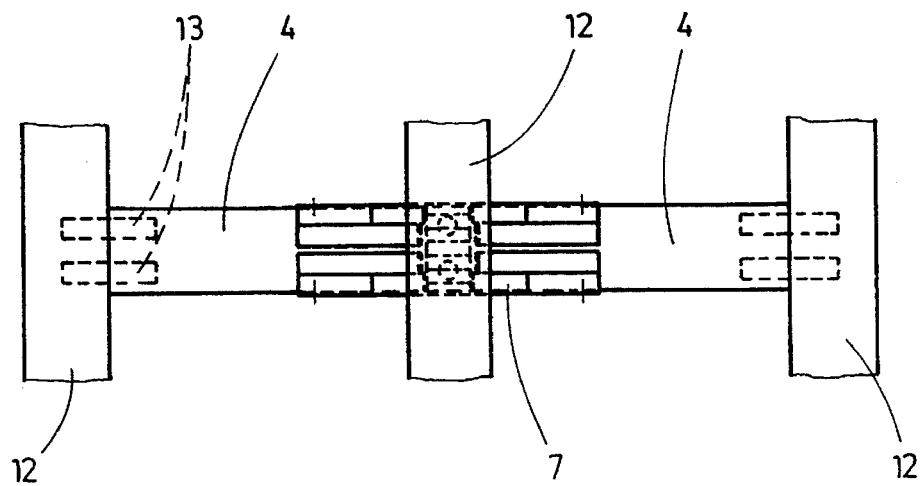
FIG. 5 shows a side view of the cross rib.

A stretcher or crossrib 1 according to FIGS. 2 through 5 for chair 2 with flat seat 3 according to FIG. 1 has four rib parts 4 of solid wood, preferably beech wood, executed as flat pieces and arranged at an angle to one another; their inside ends or butt ends 5 are interconnected by tenons 6 into a cross with different spacing angles $\alpha$, $\beta$ and are glued.

Connecting element 7 is used to hold inside end 5 of four rib parts 4 by form fitting. Connecting element 7 is composed of top part 8 and bottom part 9. Top part 8 and bottom part 9 of connecting element 7 hold inside ends 5 of rib parts 4 in corresponding holes 10 form-fittingly and are screwed to rib parts 4.

Top part 8 and bottom part 9 of connecting element 7 consist preferably of gussets. The two gussets set opposite one another cause the torsional forces acting on the crossrib to neutralize one another.

In addition, top part 8 and bottom part 9 of connecting element 7 can be plastic shells or castings.

Chair legs 12 are attached using wooden dowels 13 to free ends 11 of rib parts 4 of crossrib 1.

Top part 8 and bottom part 9 of connecting element 7 are seated on inside ends 5 of rib parts 4 after surface treatment of rib 1 and are screwed using commercial wood screws to the rib parts.

Figure 3:
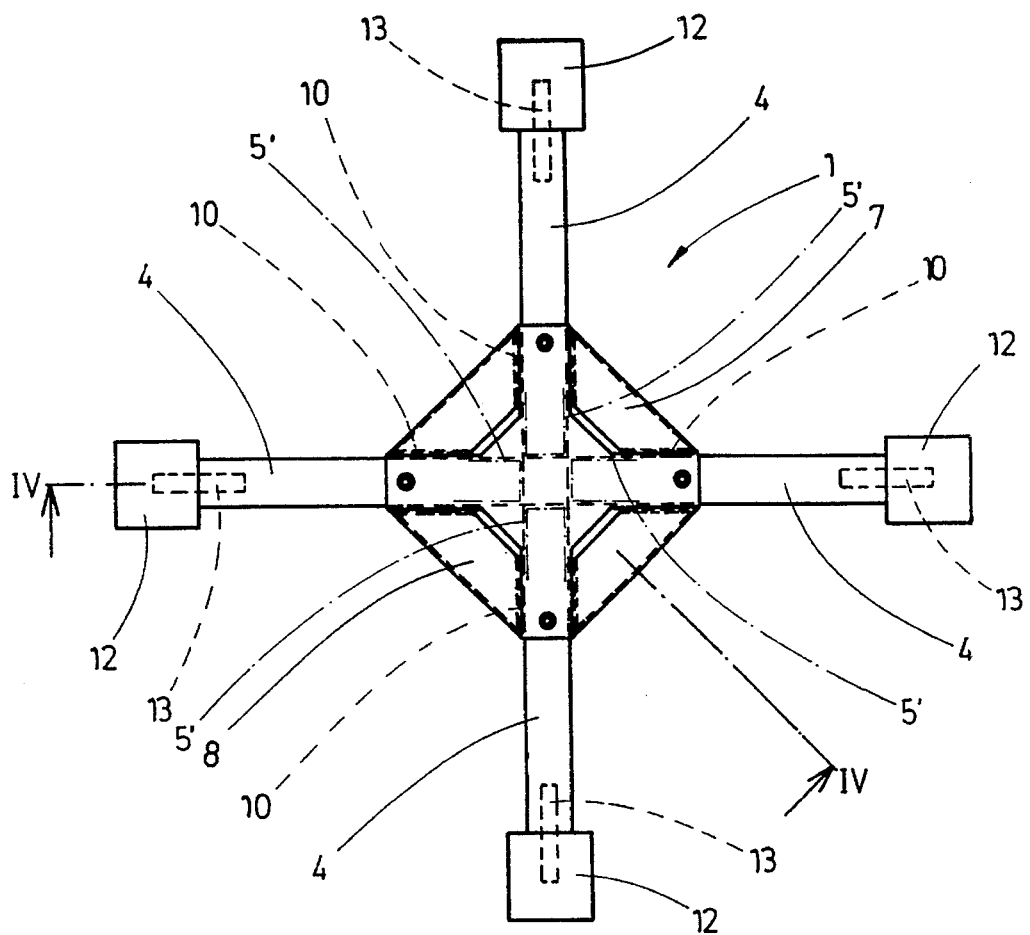
FIG. 3 shows a top plan view of the crossrib.
Figure 4:
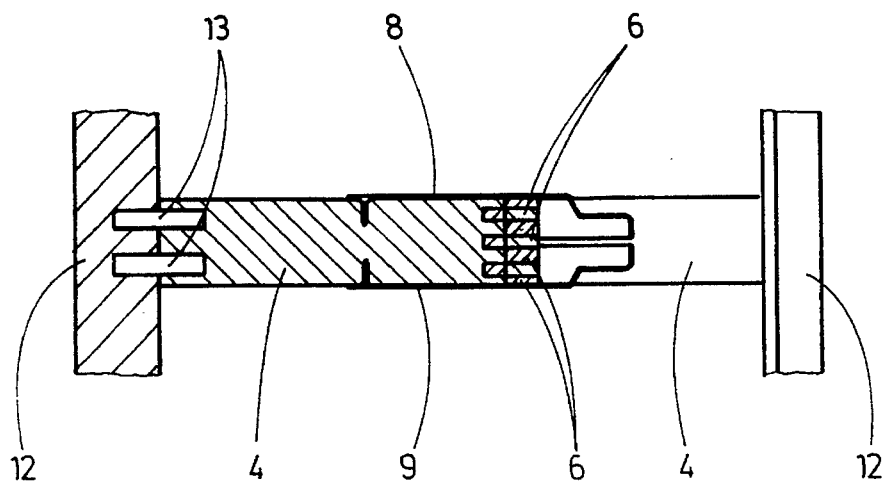
FIG. 4 shows a section according to line IV—IV of FIG. 3.

In one modified embodiment of the crossrib the inside ends of four rib parts 4 are offset from one another and are screwed using at least two screws to top 8 and bottom part 9 of connecting element 7, as is illustrated by the dash-dot outlines labeled with reference number 5' in FIG. 3.

What is claimed is:

1. A crossrib (1) for seating furniture and tables, said crossrib (1) having four wooden rib parts (4), each of the rib parts having a free end with tenons formed thereon, said free ends of the rib parts being interconnected by the tenons, a connecting element (7) interconnecting the free ends (5) of said rib parts (4) form-fittingly into a cross, said connecting element (7) being composed of top and bottom parts (8 and 9), said top part (8) and bottom part (9) holding said rib parts (4) in recesses in said top part (8) and bottom part (9), said connecting element (7) being screwed to said rib parts (4).

2. A crossrib according to claim 1, wherein said free ends (5) of said rib parts (4) are glued.

3. A crossrib according to claim 1, wherein said top part (8) and said bottom part (9) of said connecting element (7) consist of gussets.

4. A crossrib according to claim 1, wherein said top part (8) and said bottom part (9) of said connecting element (7) are plastic shells.

* * * * *